United States Patent [19]

Mammone

[11] Patent Number: 5,835,265
[45] Date of Patent: *Nov. 10, 1998

[54] LARGE NUMERICAL APERTURE IMAGING DEVICE

[75] Inventor: Richard J. Mammone, Bridgewater, N.J.

[73] Assignee: Computed Anatomy Incorporated, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 683,717

[22] Filed: Jul. 18, 1996

Related U.S. Application Data

[60] Provisional application No. 60/002,010 Aug. 7, 1995 and 60/002,684 filed Aug. 14, 1995.

[51] Int. Cl.[6] ............................. G02B 21/00; G02B 21/36
[52] U.S. Cl. ......................... 359/383; 359/363; 359/368
[58] Field of Search .................................. 359/362–366, 359/368–369, 380, 382–385, 389, 558–559, 726–731, 850, 857–860; 348/75, 79–80, 207, 335–354; 382/128, 280; 250/222.1, 239; 356/206, 347, 375

[56] References Cited

U.S. PATENT DOCUMENTS

| | | | |
|---|---|---|---|
| 2,212,211 | 8/1940 | Pfund | 359/385 |
| 3,164,781 | 1/1965 | Goldberg | 359/858 |
| 3,244,073 | 4/1966 | Bouwers et al. | 359/727 |
| 4,832,447 | 5/1989 | Javidi | 350/162.13 |
| 4,974,094 | 11/1990 | Morito | 348/80 |
| 5,144,495 | 9/1992 | Merton et al. | 359/385 |
| 5,193,124 | 3/1993 | Sabbarao | 382/280 |
| 5,530,772 | 6/1996 | Storey | 382/280 |
| 5,642,149 | 6/1997 | Palum | 359/858 |

FOREIGN PATENT DOCUMENTS

| | | | |
|---|---|---|---|
| 1030582 | 5/1958 | Germany | 359/368 |
| 1675827 | 9/1991 | Russian Federation | 359/368 |

*Primary Examiner*—Thong Nguyen
*Attorney, Agent, or Firm*—Fish & Richardson P.C.

[57] ABSTRACT

A microscope having a high effective numerical aperture (NA) is achieved in an apparatus in which a real, three-dimensional image is formed of an object placed in an aperture at the apex of one of two facing, axially-aligned concave mirrors. The three-dimensional image is acquired by a video camera positioned in a counterpart aperture at the apex of the other mirror and the acquired image is processed by computer. The processing corrects the acquired image using the point spread function of the mirror system which was previously obtained by positioning a point source of light throughout the object space and measuring the pixel values recorded by the camera's array of sensing element while the camera was positioned at different axial distances in the image space. When the diameter of the mirrors is large compared to the specimen object, substantially all of the light leaving the specimen is captured by the mirrors and focused upon the camera, thereby achieving a high effective numerical aperture for the system which affords excellent resolution, especially when examining transparent specimens.

8 Claims, 4 Drawing Sheets

LARGE NUMERICAL APERTURE IMAGING DEVICE

This application claims the benefit of provisional applications 60/002,010, filed Aug. 7, 1995 and 60/002,684 filed Aug. 14, 1995.

BACKGROUND OF THE INVENTION

In a conventional optical microscope, magnifying power is determined by multiplying the magnification of the ocular (eyepiece) by the magnification of the objective. For example, a low-power objective might have a magnification of 4× and a high-power oil-immersion objective 100×. If each is used with an ocular of 10× magnifying power, magnifications of 40× and 1,000× are obtained. The smallest object that can be seen in an optical microscope is limited by the wave character of light to a size of the order of one light wavelength. The numerical aperture (NA) of a lens is given by $\eta \sin \theta$, where $\theta$ is the half-angle of the cone of light accepted by the objective lens and Ti is the refractive index of the medium between the specimen and the lens. The resolution of a microscope is defined as the limiting distance at which two points can be separated and still be resolved as two separate points. Lord Rayleigh showed this distance to be $$d_A = 1.22 \frac{\lambda_0}{NA_{obj} + NA_{cond}} \quad (1)$$

where $\lambda_0$ is the wavelength of light in air, $NA_{obj}$ and $NA_{cond}$ are the numerical apertures of the objective and condenser lenses, respectively. From the above equation it is obvious that it is necessary for the lens system to have a large numerical aperture if good resolution is desired. According to Abbe, the limit of detail resolution of a diffraction-limited microscope is reached when the numerical aperture of the objective lens is large enough to capture the first-order diffraction pattern produced by the detail at the wavelength employed. Under optimal conditions, using Koehler illumination and an oil-immersion lens, in which a drop of oil is placed on the specimen slide and the lens is dipped into the drop, objects as small as 200 nm ($0.2 \times 10^{-6}$ meters) can be resolved with a magnification of about 1,000X.

Where, however, the amount of light that can be focused on the specimen is limited to that which the specimen can withstand, such as during an ophthalmological examination of the cornea, it not possible to achieve nearly as good magnification or resolution. Using the technique of illuminating only a small portion of the specimen at a time, but with a high-intensity, narrow, light beam which is sequentially scanned across the field, conventional slit lamp microscopes are able to provide magnification in the range of 40–60×. The narrowness of the beam limits the number of photons reaching the specimen at any one time. Both the slit lamp microscope and the tandem scanning reflected light microscope rely on this successive illumination technique which requires that the object remain stationary during the entire time that it is being sequentially illuminated. It would be desirable to obtain comparable magnification without, however, requiring the object to remain stationary for the entire image acquisition process, would not limit the illumination of the object and which could achieve a good magnification and resolution.

SUMMARY OF THE INVENTION

In accordance with the principles of my invention, in one illustrative embodiment thereof, I provide a microscope which acquires a real, three-dimensional image of the specimen without requiring a high-intensity light beam to be physically scanned across the specimen object. The three-dimensional reflecting microscope of my invention has a high effective numerical aperture (NA) which is achieved by the use of two, large-diameter, facing concave mirrors sharing a common optical axis. Each of the mirrors has an aperture at its vertex, the point where the mirrored surface is cut by the optical axis. The specimen object is placed at the aperture of one of the mirrors and a video camera is placed at the aperture of the other mirror. The diameter of the mirrors is sufficienty large compared to the specimen that substantially all of the light leaving the specimen is captured by the mirrors and focused upon the camera. The acquired image is electronically stored and processed by computer. Because the image is a three-dimensional image and because of the high effective numerical aperture of the system which provides for good resolution in depth, the image acquired by moving the camera to different positions along the optical axis can simulate sectioning at different depths of the specimen object. In the illustrative embodiment, both mirrors are confocal and of the same diameter and, by themselves, provide only unity magnification. Magnification of the image is introduced by the spacing of the sensors of the video camera sensor array. Since the three-dimensional reflecting microscope receives a large cone of light from the object (i.e., has a high NA), the video camera requires a minimal amount of time to acquire the image. With exemplary CCD sensor spacing of 10 microns, resolution of about 10 microns ($10^{-5}$ meters) is achievable using commercial 8" by diameter concave mirrors. The high numerical aperture of the reflecting microscope offers the advantages of being able to acquire an image more rapidly at a lower light level than is possible with a slit lamp microscope, which requires that the object be physically scanned with a high intensity light.

Further in accordance with the illustrative embodiment, the instrument is calibrated by measuring the light intensity at points throughout the 3-D image produced by a physically realized point source of light positioned in the object space. A fast Fourier transform of the array of light intensity values is taken and divided by the fast Fourier transform of the array of theoretical light intensity values that should be produced by a similarly positioned true pinpoint source to yield the point spread function of the mirror system Knowing the point spread function of the mirror system, the image obtained from an actual specimen may be corrected for the presence of adjacent artifacts by multiplying the intensity of each pixel of interest in the image by an appropriate correction factor, i.e., a superposition of the neighboring pixels weighted by their point spread function.

Because a pinhole in a substrate having a finite thickness will emit a light be having a cone angle that might not be sufficient to illuminate the surface of the large mirrors, steps must be taken during the calibration process to provide an effective pinhole source that will illuminate as much of the mirrors' surface as possible. Accordingly, it is advantageous to employ a pinhole light source together with a diffusing membrane at the pinhole's entrance to ensure that light from many different angles passes through the pinhole. Using a diffusing membrane at the entrance of a 10 micron diameter hole in a 2.5 micron thick substrate in front of a collimated light source produces an emerging light beam having a cone angle of approximately 90 degrees, thereby adequately covering the mirrors' surface. In this manner, when an actual specimen is positioned in the object aperture, the point spread function obtained of the system will have sufficient data so that the acquired image of the specimen may adequately be corrected.

As an alternative, the collimated light beam may be passed through a high numerical aperture microscope objective (such as a 40X lens having an NA≅0.65) positioned in the object space so as to produce an emerging light beam having a large enough cone angle, e.g., in excess of approximately 81 degrees, to cover most of the mirrors' surfaces.

As an additional alternative, instead of using a 10 micron pinhole light source, a somewhat larger 100 micron diameter spot on a diffuse surface that is sequentially positioned throughout the specimen space may be employed and the reflected light therefrom incident on the pixels of the CCD array measured.

The effective pinhole source is then sequentially positioned throughout the maximum length, breadth and depth of the volume of the object space for which the mirror system is designed and the light incident on the plane of sensors of the camera array positioned at various image distances in the image space is measured.

BRIEF DESCRIPTION OF THE DRAWING

The foregoing and other objects and features are achieved in the illustrative embodiment shown in the drawing, in which:

FIG. 2a is a schematic section taken through the Y-Z plane of FIG. 1;

FIG. 2b illustrates the geometry of the maximum cone of light that can be captured by the mirror system of FIG. 1, while FIG. 2c shows the maximum cone of light capturable by the objective lens of a conventional microscope;

GENERAL DESCRIPTION

Figure 1:
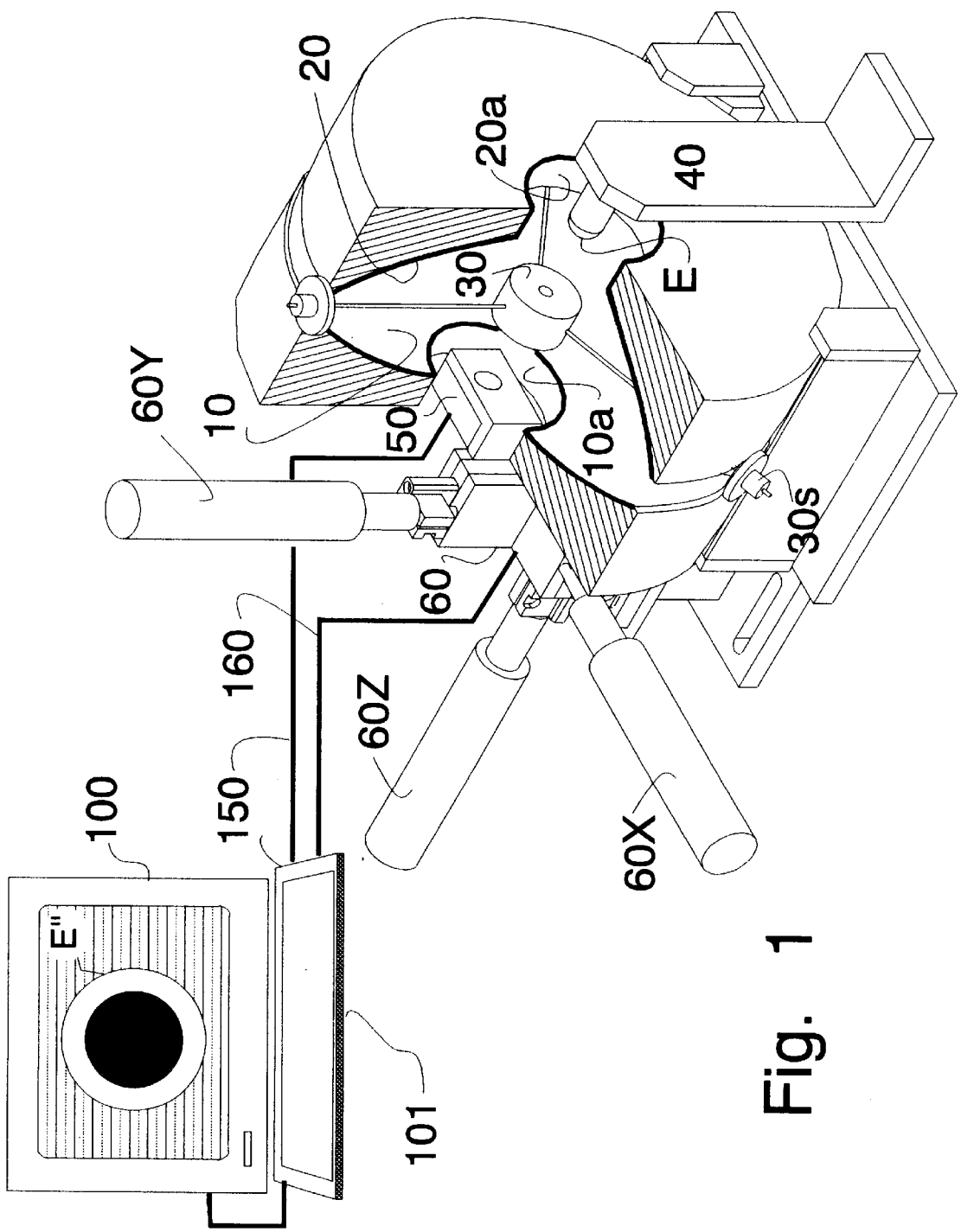
FIG. 1 is a partial isometric view of the confocal reflecting microscope system of my invention.

Referring to FIG. 1 the confocal microscope of my invention is seen to be comprised of two facing concave mirrors, 10, 20 having their optical axes co-axially aligned. Each mirror has a respective aperture 10a, 20a at the apex of its curved surface. Positioned intermediate mirrors 10 and 20 is a spider support structure 30s which carries lamp 30 for illuminating an object which is positioned on stage 40 so as to be within aperture 20a of mirror 20. Positioned within aperture 10a of mirror 10 is a video camera 50 mounted on 3-axis movable stage 60. The position of camera 50 is adjustable by means of vernier drives 60X, 60Y and 60Z which move camera 50 in the x, y, and z directions, respectively, to correctly align the camera on the optical axis. Under the control of signals delivered over cable 160 from computer 101, camera 50 will then be moved along the Z axis to acquire images at various depths.

Figure 2:
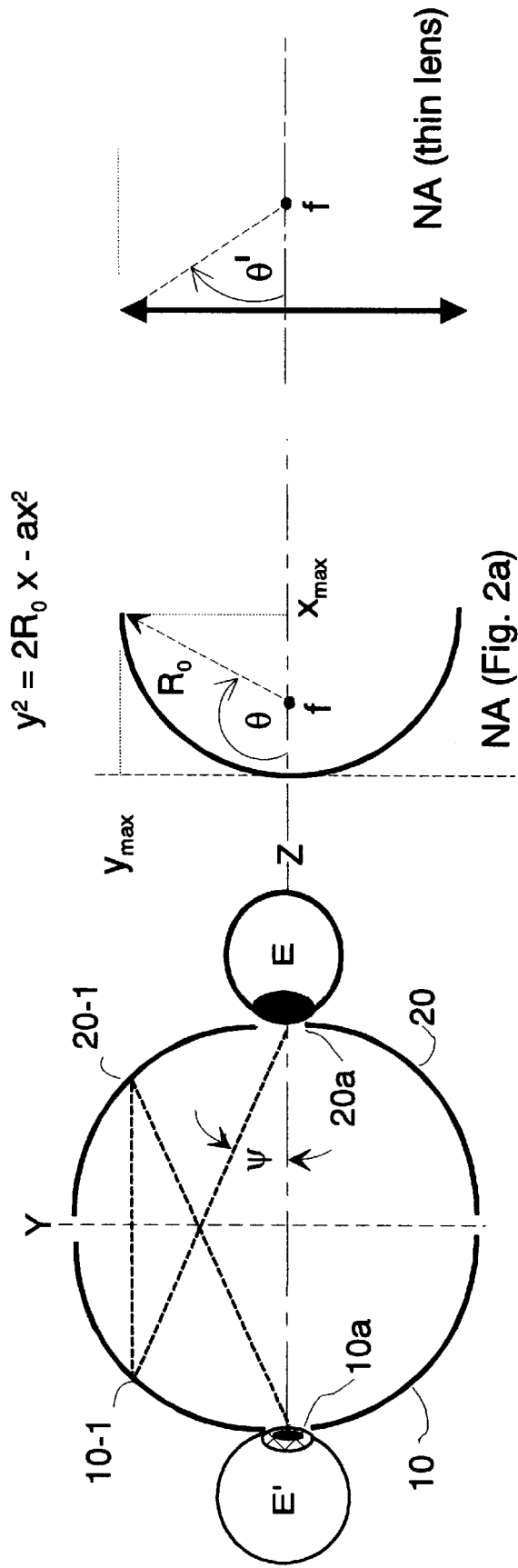

Referring now to FIG. 2a, there is shown a schematic section taken through the Y-Z plane of FIG. 1 with the object E positioned in aperture 20a of mirror 20. A single arbitrary ray trace has been shown in dotted lines drawn from the object E toward mirror 10 at an upwardly oblique angle Or towards the left where it is reflected by mirror 10 at point 10-1. Mirror 10 reflects this ray back toward mirror 20 parallel to the optical Z-axis striking mirror 20 at point 20-1, where it is reflected toward aperture 10a of mirror 10. As shown in U.S. Pat. No. 2,628,533, facing confocal mirrors are capable of forming a real image of an object. Accordingly, at aperture 10a, a real image E' appears of object E.

This image E' is acquired by camera 50 and, as shown in FIG. 1 transmitted over cable 150 to computer 101 where it is processed and applied to be magnified on the screen of computer monitor 100. The degree of magnification is dependent upon the spacing of the sensor elements (not shown) in camera 50. With exemplary CCD sensor spacing of 10 microns, resolution of about 10 microns ($10^{-5}$ meters) is achievable using commercial 8" diameter concave mirrors. The high numerical aperture of the reflecting microscope offers the advantages of being able to more rapidly acquire an image at a lower light level than is possible with a slit lamp microscope which requires that the object be physically scanned with a high intensity light. The numerical aperture of the concave mirror system 10, 20 is determined by the half angle of the cone of light accepted from the objective multiplied by the refractive index η of the medium between the specimen and the lens.

In FIG. 2b the geometry of the mirror system is illustrated for a mirror of generic curvature and having a maximum depth and height $x_{max}$ and $y_{max}$, respectively, and the focus at f. As noted above, the numerical aperture NA is determined by the sine of the half-angle of the cone of light that can be captured, η sin θ. The lateral resolution of the concave mirror system 10, 20 is proportional to the NA while axial resolution is proportional to $NA^2$. From the geometry of the mirrors, the sine of the angle θ when $θ=θ_{max}$ is given by:

$$\sin θ_{max} = \frac{y_{max}}{\sqrt{(f-x_{max})^2 + y_{max}^2}} \qquad (2)$$

In general, the equation for the curvature of a section is given by:

$$y^2 = 2R_0X - aX^2 \qquad (3)$$

where $R_0$ is the apical radius and a is the shape factor of a mirror. For a spherical mirror, a=1 and for a parabolic mirror, a=0. In the illustrative embodiment the radius $y_{max}$ of mirrors 10, 20 are each approximately 4 inches, f=3.5 inches and $X_{max}$=3, yielding an NA of approximately 0.99. It should be noted that the maximum angle $θ_{max}$, which is a measure of the cone of light that can be captured by the concave mirror of FIG. 2b, may be larger than 90°. For purposes of contrast, FIG. 2c shows that the maximum value of the angle θ that is obtainable using the refractive optics of a conventional microscope's objective lens can never exceed 90°.

Figure 3:
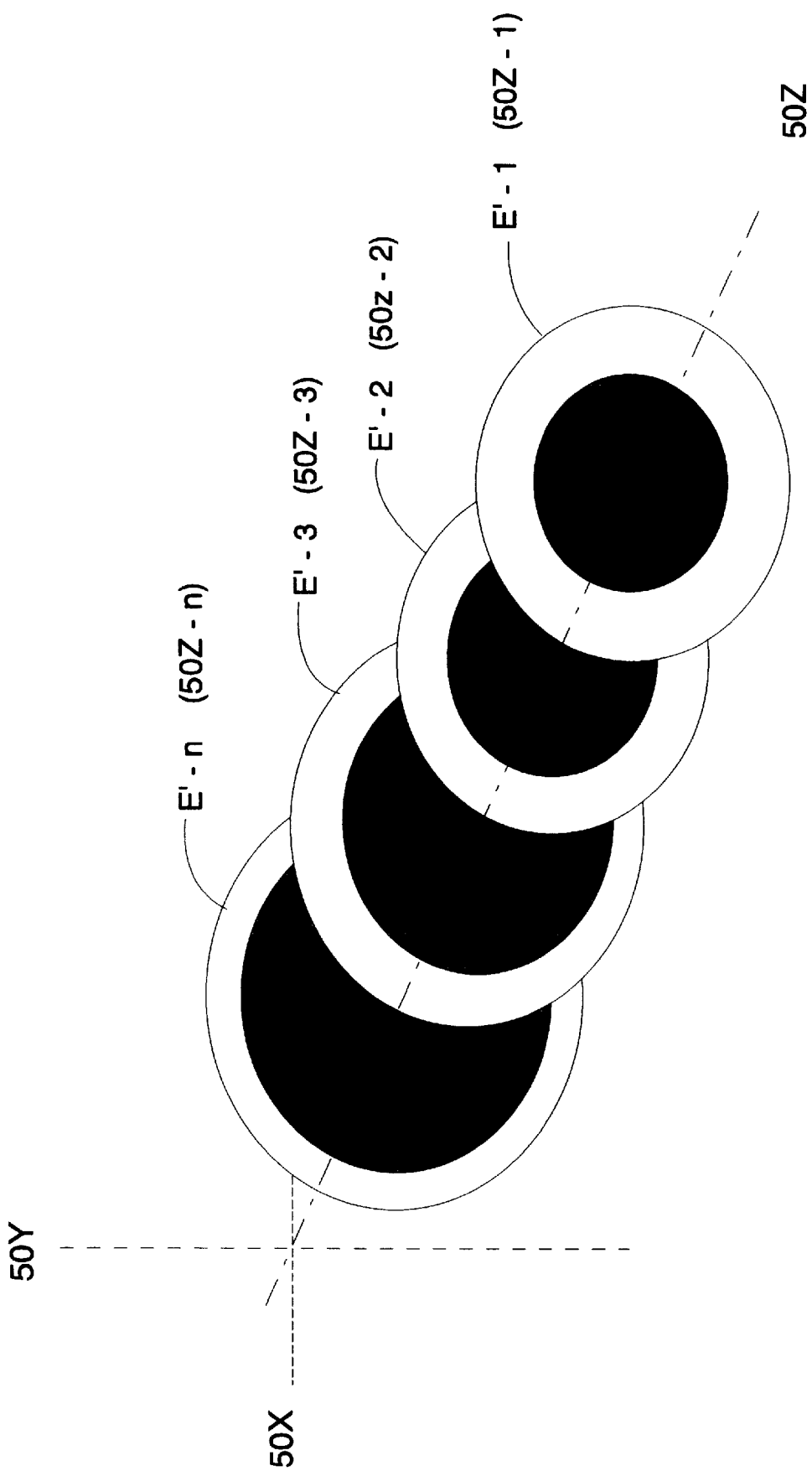
FIG. 3 is a schematic representation of an illustrative, 3-dimensional sectioned image of an eye obtained by variously positioning camera 50 along the Z-axis of FIG. 1.

Referring now to FIG. 3, sections of the real, three-dimensional image E' appearing at aperture 10a are shown. Adjustment of verniers 60X, 60Y and 60Z of the apparatus of FIG. 1 positions camera 50 to intercept any particular feature throughout the length, breadth or depth of the image E' which is, of course, equivalent to sectioning through the real object E. This is particularly advantageous, for example, in examining a transparent tissue sample for artifacts which may exist anywhere throughout the depth of the specimen. Four different positions of camera 50 along the Z-axis are shown in FIG. 3 at 50Z-1, 50Z-2, 50 Z-3, . . . 50Z-n which intercept four different planes or layers E'-1 through E'-n in the image.

Figure 4:
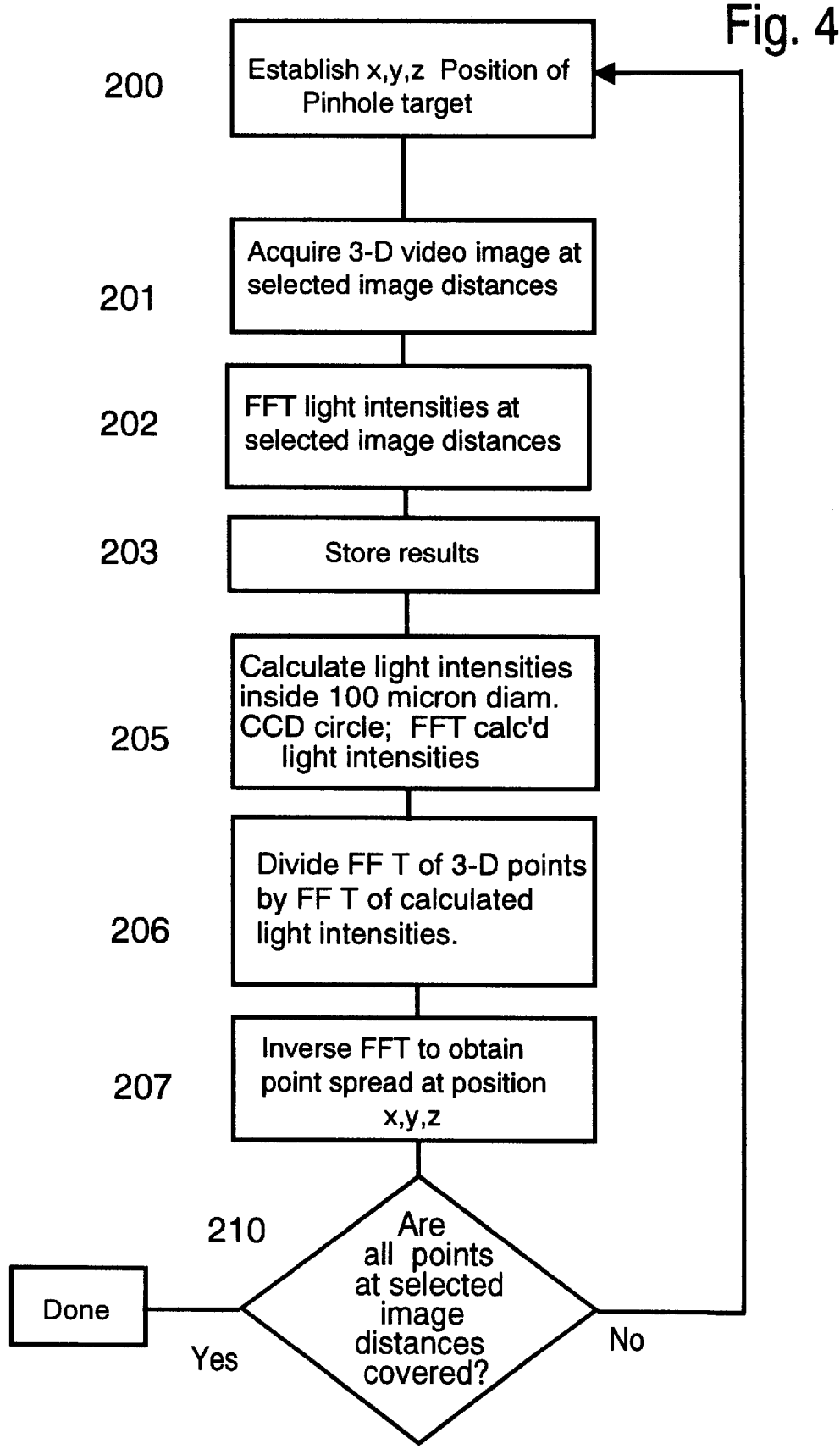
FIG. 4 is a flow chart of the calibration process for removing the effects of reflected and scattered light from points adjacent to the point desired to be observed in the specimen.

Referring now to FIG. 4 there is shown a flow chart for calibrating the confocal microscope of FIG. 1. A pinhole light source is placed on stage 40 and its position is carefully noted in step 200. In step 201, computer 101 controls movable stage 60 over cable 160 so that camera 50 is sequentially positioned to record light values throughout the 3-D image space at aperture 10$a$. The stage 40 is then moved to re-position the pinhole light source to another x, y, z point in the object space and camera 50 is again positioned to record light values throughout the 3-D image space. The process is continued until camera 50 acquires a complete video record which is passed to computer 101 over cable 150.

In step 202 computer 101 performs a fast Fourier transform (FFT) of the information from the step 201 and stores the results in step 203. In step 205 the theoretical light intensities that would be produced inside an illustrative 100$\mu$ diameter circle on the pixels of the CCD array of camera 50 by a theoretically perfect pinhole source at E are calculated and an FFT of these light intensities is performed.

In step 206 the stored FFT values obtained from step 203 are divided by the FFT of the theoretical light intensities. In step 207 the inverse FFT of the values obtained from step 206 is calculated to obtain the point spread function. In step 210 the process calls for repeating the above steps if not all of the desired x, y, z positions for object E have been processed. In this manner the complete point spread function of the apparatus is obtained so that when any desired sample is placed on stage 40, the image acquired by camera 50 can be corrected depending upon which position of the image is then being examined.

What has been described is deemed to be illustrative of the principles of my invention. Numerous modifications may be made thereto, such as increasing the illumination of the object by moving lamp 30 outside the enclosure and replacing the lamp by a 45° half-silvered mirror. In addition, lamp 30 may also be replaced by an external "slit lamp" or scanning illumination source. Moreover, computer 101 may be programmed to address one line of pixels in camera 50 at a time while the camera is moved throughout the 3-D image space. In addition, camera 50 may be implemented using any form of video capture device including, without limitation, CCD, metal oxide silicon (MOS), CID, vidicon or the like. Other modifications may be made by those skilled in the art without, however, departing from the spirit and scope of my invention.

What is claimed is:

1. A large numerical aperture imaging device comprising:

first and second concave mirrors having respective first and second concave reflective surfaces facing each other along an optical axis, each of said surfaces having an aperture at said optical axis, said surfaces being aligned so that most of the light rays from an object placed near the aperture of said first surface are captured at said aperture of said second surface to form a three-dimensional real image thereat, said concave mirrors thereby being used to capture light from said object;

an object support that positions an object at said aperture of said first surface;

an image acquisition device that is mounted for movement along said optical axis at said aperture of said second surface in order to section through said three-dimensional image at various depths along said optical axis thereof, and means for analyzing the three-dimensional real image acquired by said image acquisition device at said various depths along said optical axis.

2. The imaging device of claim 1 wherein said means for analyzing said image includes a digital computer programmed for processing light intensities existing at said various depths of said acquired three-dimensional image.

3. The imaging device of claim 2 wherein said image acquisition device contains a planar array of sensors for ascertaining said light intensities at said various depths of said acquired three-dimensional image.

4. The imaging device of claim 3 wherein said sensors are selected from the group consisting of charge-coupled devices, metal oxide silicon (MOS) devices, CID devices or vidicon devices.

5. The imaging device of claim 3 wherein said computer includes means for comparing the fast Fourier transform of light intensities from a specimen object imaged at said various depths with the fast Fourier transform of light intensities imaged at said depths by a point source of light positioned at said first-mentioned aperture to obtain the point spread function of said light source.

6. The imaging device of claim 5 wherein said computer is capable of correcting said acquired image for light intensities from the specimen object failing to correspond with the light intensities imaged from said point source.

7. The imaging device of claim 3 wherein said object is a point source of light and wherein said means for analyzing said acquired image includes a computer program for storing the light intensities of said acquired image, received by said image acquisition device in planes perpendicular to the optic axis at each of said various depths.

8. The imaging device of claim 1, further comprising a movable stage, said image acquisition device being mounted on said movable stage, said movable stage being capable of moving said image acquisition device in three dimensions relative to said three-dimensional image.

* * * * *